M. T. Briggs,
Hame Fastener,

N° 65,334.   Patented June 4, 1867.

Witnesses.

Inventor.
M. T. Briggs
By his Atty.

United States Patent Office.

MARTIN T. BRIGGS, OF SCHOOLCRAFT, MICHIGAN.

Letters Patent No. 65,334, dated June 4, 1867.

IMPROVED HAME-STRAP.

*The Schedule referred to in these Letters Patent and making part of the same.*

TO ALL WHOM IT MAY CONCERN:

Be it known that I, MARTIN T. BRIGGS, of Schoolcraft, in the county of Kalamazoo, and in the State of Michigan, have invented a new and useful Improvement in Hame-Straps; and do hereby declare the following to be a full, clear, and exact description of the same, reference being had to the accompanying drawings, in which—

Figure 3 is a section taken on line $x\,x$.

My invention consists in a metallic jointed coupling or strap to unite the lower ends of the harness hames, so that, first, it can be adjusted to suit the dimension of the collar, i. e., by lengthening or shortening the strap; second, it can draw the ends of the hames forcibly together and secure them without relaxing; third, it can be loosened and detached without effort; fourth, it will hold with perfect security, and be permanently attached to one part of the hames so that there will be no liability to lose any of the parts.

That others may understand my invention, I will particularly describe it.

Figure 1:
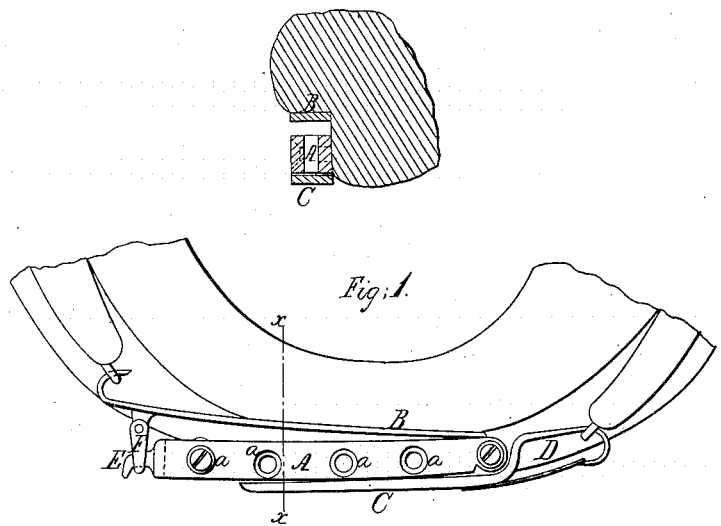
Figure 1 is an enlarged view of my hame-fastening detached.

A is the body or central part of my strap. It is slitted lengthwise from one end nearly through its whole length, and the several holes $a\,a\,a\,a$ are bored through from side to side. At the slitted end the part B is pivoted permanently by a screw or rivet, and the part C is secured by a pivot-pin or screw inserted through one of the holes $a$ and passing through a lug attached to C, which projects upwards into the slit in A. The free ends of B and C are turned over so as to form hooks, which are to engage with the eyes at the lower ends of the hames. The hook D, at the free end of the part C, is provided with a snap-spring, so that when this hook is passed through the proper eye it cannot become disengaged without the application of force for that purpose. At the solid end of the part A is the projecting finger or stud E, hooking downward at its end, and to the lower side of the part B, directly over the stud E, when the parts A and B are lying in contact, as shown in fig. 1, is attached by a pivot-pin the stirrup F, by means of which the parts A and B are held in contact and the strap is made effective.

Figure 2:
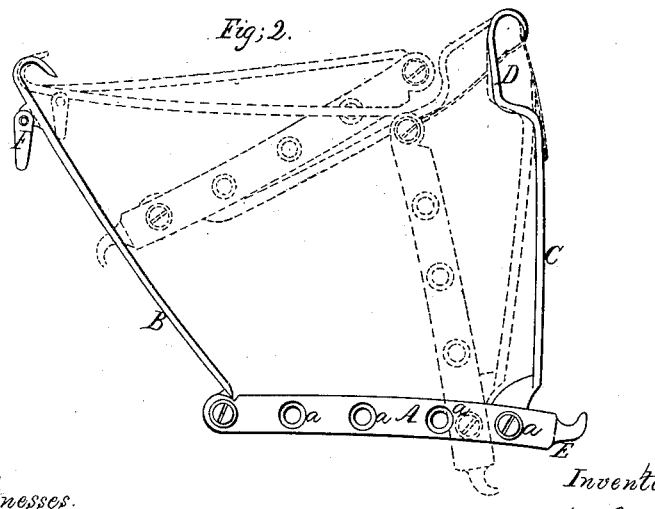
Figure 2 shows the same in operation.

The operation is very simple and effective. When the hames are adjusted upon the collar the strap is hanging to one part thereof by the snap-hook D. The hook at the free end of the part B is then raised and inserted through the eye at the lower end of the other hame, bringing the strap to the position shown in fig. 2. When this has been done the slitted end of A is raised up into the position shown by red lines in fig. 3; the solid end of A is then raised in the opposite direction, bringing the parts into the position shown in fig. 1; and when in that position the stirrup F is slipped under the hook E, and the parts are held securely in that position, the elasticity of the collar being sufficient to maintain constant pressure upon the stirrup, and thus prevent the accidental disengagement of hook and stirrup. It will be perceived that during the last movement of the part A it acts as a powerful lever, and with a small expenditure of force will effect a powerful compression of the lower end of the collar so as to hold the hames securely in place, and when the harness is to be removed a slight pressure upward will enable the attendant to release the stirrup F from the hook and permit the strap to unfold so that the part B may be unhooked and the hames released. The part C may be pivoted to the part A at either of the several points $a\,a$ by shifting the pivot-pin or screw so that the length of the strap may be adjusted to the circumstances and requirements of the particular harness.

Having described my invention, what I claim as new, and desire to secure by Letters Patent, is—

A jointed metallic hame-strap, composed of the three parts A, B, and C, constructed and operating substantially as set forth, and provided with a holding device to lock and retain the parts in holding position.

MARTIN T. BRIGGS.

Witnesses:
C. F. WHEELER,
J. W. PURSEL.